United States Patent
Message et al.

(10) Patent No.: US 6,655,844 B1
(45) Date of Patent: Dec. 2, 2003

(54) ROLLER BEARING WITH INFORMATION SENSOR

(75) Inventors: Olivier Message, Tours (FR); Franck Landrieve, Fondettes (FR); Michel Descombes, Versailles (FR)

(73) Assignee: SKF France, Montigny-le-Bretonneux (FR)

( * ) Notice: Subject to any disclaimer, the term of this patent is extended or adjusted under 35 U.S.C. 154(b) by 0 days.

(21) Appl. No.: 09/959,475
(22) PCT Filed: Apr. 18, 2000
(86) PCT No.: PCT/FR00/00996
§ 371 (c)(1),
(2), (4) Date: Jan. 17, 2002
(87) PCT Pub. No.: WO00/67038
PCT Pub. Date: Nov. 9, 2000

(30) Foreign Application Priority Data

Apr. 28, 1999 (FR) .............................. 99 05376

(51) Int. Cl.⁷ .............................................. F16C 32/00
(52) U.S. Cl. ..................................................... 384/448
(58) Field of Search ........................ 384/448; 324/173, 324/174, 207.25

(56) References Cited

U.S. PATENT DOCUMENTS

| | | | | |
|---|---|---|---|---|
| 4,946,296 A | | 8/1990 | Olschewski et al. ........ | 384/448 |
| 5,026,178 A | * | 6/1991 | Ballhaus .................... | 384/448 |
| 5,372,435 A | * | 12/1994 | Genero et al. .............. | 384/448 |
| 5,431,413 A | | 7/1995 | Hajzler ...................... | 277/2 |
| 5,523,681 A | * | 6/1996 | Hajzler et al. ............. | 324/174 |
| 5,594,334 A | * | 1/1997 | Sonnerat et al. ........... | 324/173 |
| 5,755,517 A | * | 5/1998 | Nicot ........................ | 384/448 |
| 5,893,648 A | | 4/1999 | Smith ........................ | 384/448 |
| 5,947,611 A | | 9/1999 | Nagase ...................... | 384/448 |
| 6,043,643 A | | 3/2000 | Message et al. ............ | 324/174 |
| 6,094,046 A | | 7/2000 | Message et al. ............ | 324/173 |
| 6,227,710 B1 | | 5/2001 | Message et al. ............ | 384/448 |
| 6,338,576 B1 | | 1/2002 | Girardin et al. ............ | 384/448 |
| 6,400,136 B1 | * | 6/2002 | Grehn et al. ............... | 324/174 |

FOREIGN PATENT DOCUMENTS

| | | |
|---|---|---|
| DE | 3809904 | 10/1989 |
| EP | 0 495 323 | 11/1991 |
| EP | 0 785 369 | 7/1997 |
| EP | 0 822 413 | 2/1998 |
| EP | 0 890 753 | 1/1999 |
| FR | 2 678 329 | 12/1997 |

* cited by examiner

*Primary Examiner*—Thomas R. Hannon
(74) *Attorney, Agent, or Firm*—Smith, Gambrell & Russell

(57) ABSTRACT

The invention concerns a roller bearing including an outer ring, an inner ring, at least a row of rolling elements arranged between two raceways of the outer and inner rings, a seal between the outer and inner rings, and a data sensor assembly comprising a non-rotatable sensor unit borne by one of the rings and a rotatable encoding element borne by the other ring. An seal is provided on the side of the data sensor assembly to isolate the assembly from the inside of the roller bearing by co-operation with the rotating ring in a zone axially located between the encoder active part and the rolling elements.

20 Claims, 4 Drawing Sheets

ROLLER BEARING WITH INFORMATION SENSOR

The invention relates to the field of rolling bearings with information sensors equipped with an assembly for detecting rotational parameters such as the angular position, the direction of rotation, the speed and the acceleration.

Such rolling bearings with information sensors can be used, for example, to control electric motors.

The detection assembly consisting of a sensor unit and an encoder element provides the motor control system with all the information it needs, particularly the rotational speed and the position of the poles of the stator with respect to those of the rotor.

In this type of rolling bearing with information sensors, the sensor is arranged in a unit secured to the non-rotating race of the bearing, while an encoder element secured to the rotating race of the bearing rotates past the sensitive part of the sensor so as, in collaboration with the latter, to generate a signal that represents the rotation of the rotating element, it being possible, for example, for the sensor/encoder assembly to be of the magnetic type or alternatively of the optical type.

In electric motors, the rolling bearings used are generally of the rigid ball bearing type. These are bearings with a single row of balls arranged between two raceways in the form of toroidal channels, one raceway being formed on the outer race and one raceway being formed on the inner race. A cage keeps a uniform circumferential spacing between the balls. Two seals are mounted, one on each side of the bearing, to prevent any ingress of contaminants into the bearing and to keep the lubricant inside the latter.

The seals generally comprise a metal armature coated with elastic material (rubber, elastomer, etc.) intended to form a static seal with the race on which the seal is fixed and a rubbing dynamic seal with the other race. The static seal which also serves to fix the seal to one of the races is generally in the form of an annular lip or of a bulge projecting radially with respect to the periphery of the armature of the seal. The seal is fixed by forcing the annular bulge into an annular groove formed in the race, generally the outer race.

The dynamic seal is generally in the form of one or more annular lips which come into rubbing contact with bearing surfaces formed on the other race of the bearing, generally the inner race of the bearing, between the raceway and a radial lateral face of said race.

Document FR 2 678 329 describes a sealing set-up for an information sensor suited to a sealed rolling bearing. According to that document, the inner race has an interior cylindrical bearing surface adjacent to a lateral face and onto which is force-fitted a metal armature onto which a part, made of synthetic material and forming the encoder, is overmolded. The outer race has an annular groove adjacent to a lateral face axially on the same side as the encoder and into which is fixed the sensor unit which comprises a metal armature and a part made of synthetic material with an annular bulge of a shape that complements that of the groove so that it can be fixed, with sealing, into said groove.

However, this type of set-up does not allow the use of bearing surfaces that have identical shapes and sizes for the rubbing bearing surfaces of the dynamic sealing lips of each seal. The problem is that, on the detection system side, because there is very little axial space available, the encoder element is mounted on a short cylindrical bearing surface formed on the rotating inner race, the lip of the seal starting from the sensor unit bearing against the metal armature of the encoder. The inner races have therefore to be designed and machined especially for this application, which prevents the use of less expensive standard races which are mass-produced and widely used for sealed rolling bearings of the "ISO" series, which have no means of measuring rotation parameters.

Furthermore, producing the dynamic seal by the rubbing of a lip against a sheet metal armature prevents the use of a dynamic seal of highly complex shape which provides a high level of sealing, something which is needed in certain cases. In addition, the surface of the armature that is in contact with the sealing lip may have a geometry that experiences some degree of spread from one bearing to another. There may therefore be, in this area, the risk of grease leaking from the inside of the bearing to the outside. Finally, the gap between the encoder and the sensor is not protected against the bearing lubricant, something which is unacceptable in the case of the use of an optical sensor.

Now, it is essential, for bearing life reasons, particularly for applications operating at relatively high temperatures and speeds, that the bearing has effective seals that make it possible to retain, with a minimum of friction, the grease initially packed into the bearing.

It is an object of the present invention to overcome these drawbacks.

It is an object of the present invention to propose an instrumented rolling bearing with a high level of sealing and which is economical to produce.

The rolling bearing device according to the invention is of the type comprising an outer race, an inner race, at least one row of rolling elements arranged between two raceways of the outer and inner races, means of sealing between the outer and inner races, an information sensor assembly comprising a non-rotating sensor unit supported by the non-rotating race and an encoder element comprising an annular support and an active part, said encoder element being mounted on the rotating race via the annular support, the active part of the encoder element being arranged axially on the outside of the rotating race. Additional sealing means are provided on the information sensor assembly side to isolate said assembly from the inside of the bearing by collaborating with the rotating race in a zone lying axially between the active part of the encoder and the rolling elements.

The additional sealing means may be in direct contact with a bearing surface of the rotating race.

In one embodiment of the invention, the annular support of the encoder element comprises an armature comprising a radial portion coming into contact with an external radial face of the rotating race. The radial portion of the armature of the encoder element may be welded to said external radial face of the rotating race.

In one embodiment of the invention, a cylindrical portion meets the radial portion and extends axially toward the outside of the rotating race, said cylindrical portion supporting the active part of the encoder.

In one embodiment of the invention, the armature of the encoder element comprises a second cylindrical portion meeting the radial portion and extending axially toward the inside of the rotating race, the second cylindrical portion being mounted on a cylindrical bearing surface of the rotating race.

Advantageously, the device comprises a seal supported by the race to which the sensor unit is fixed and in rubbing contact with the race to which the encoder element is fixed, said seal being mounted on the opposite side to the additional sealing means.

Advantageously, the additional sealing means and the seal mounted on the opposite side and supported by the race to which the sensor unit is fixed each have at least one sealing lip, the two sealing lips being identical.

Advantageously, the additional sealing means and the seal mounted on the opposite side and supported by the race to which the sensor unit is fixed each collaborate with a bearing surface of the rotating race, the two bearing surfaces being identical.

The additional sealing means and the seal mounted on the opposite side and supported by the race to which the sensor unit is fixed may each comprise an armature, the two armatures being identical.

Advantageously, the race to which the sensor unit is fixed has two annular grooves, each formed on one side of said race, one accommodating the sensor unit and the other accommodating a seal.

In one embodiment of the invention, the additional sealing means are supported by the sensor unit. The additional sealing means may be attached to the sensor unit, or may consist of a radial extension of the sensor unit of which they form an integral part. The additional sealing means may be supported by the non-rotating race of the bearing.

Advantageously, the race to which the sensor unit is fixed comprises two annular grooves, each formed on one side of said race, one accommodating the seal on the opposite side to the sensor unit, the other groove accommodating the additional sealing means. The additional sealing means may consist of a seal identical to the one supported by the non-rotating race of the bearing, on the opposite side to the sensor unit.

In one embodiment of the invention, the armature of the encoder element comprises a second radial portion meeting the cylindrical portion supporting the active part and directed toward the sensor unit so as to afford protection by creating a narrow passage.

In one embodiment of the invention, the outer and inner races are symmetric with respect to a radial plane passing through the centers of the rolling elements.

Thus, the encoder is mounted on the rotating race, completely away from the bearing surface zone of the seal. It is therefore possible to enjoy good dynamic sealing, for example sealing identical to that of an uninstrumented standard bearing. This arrangement also makes it possible to use standard races, standard sealing armatures and standard sealing lips, hence giving a substantial saving in terms of manufacture or purchase and in terms of stock control.

The present invention will be better understood and other advantages will become apparent from reading the detailed description of a number of embodiments which are taken by way of purely nonlimiting examples and illustrated by the appended drawings, in which.

Figure 1:
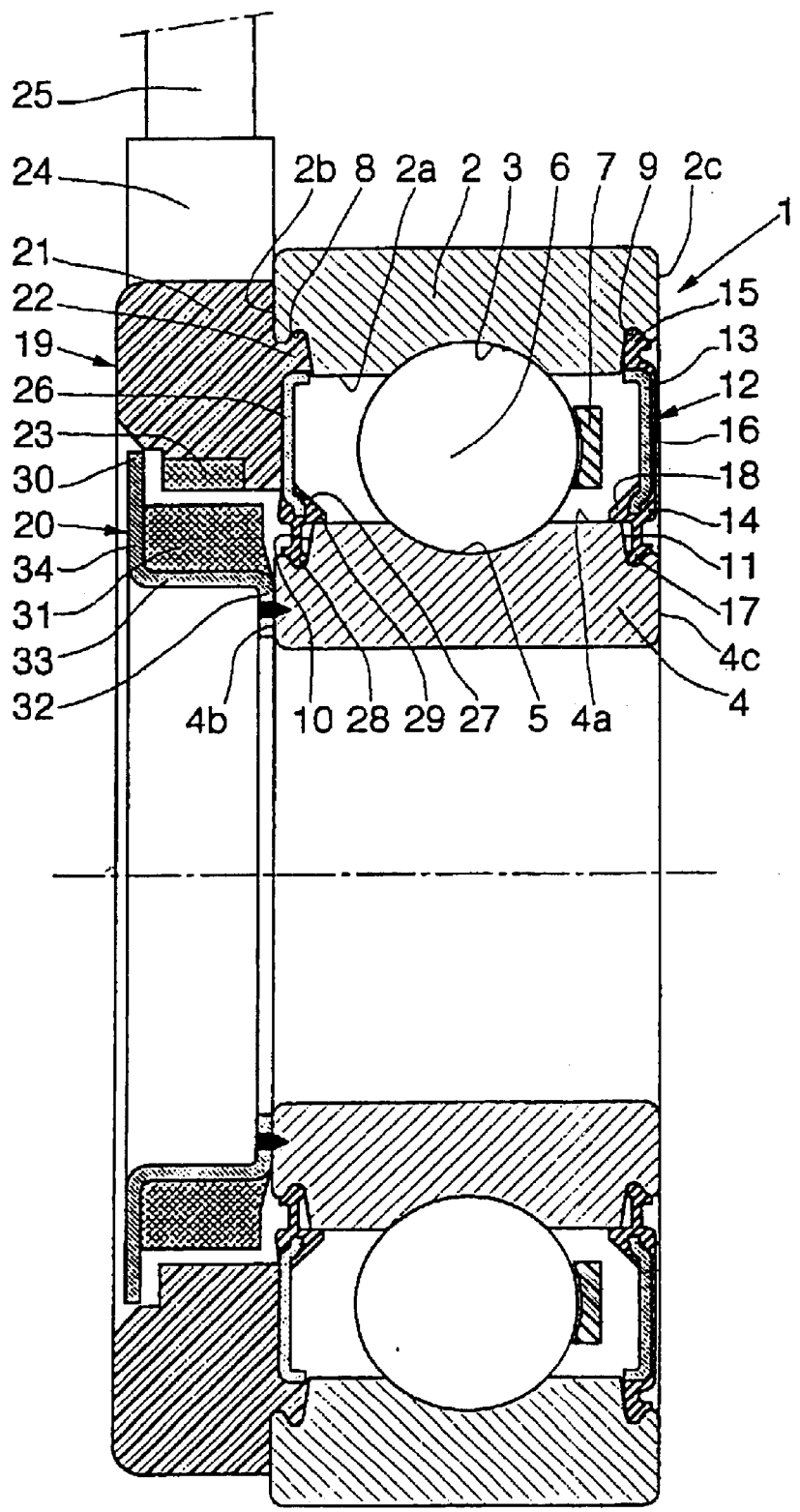
FIG. 1 is a view in axial section of a rolling bearing according to a first embodiment of the invention.
Figure 2:
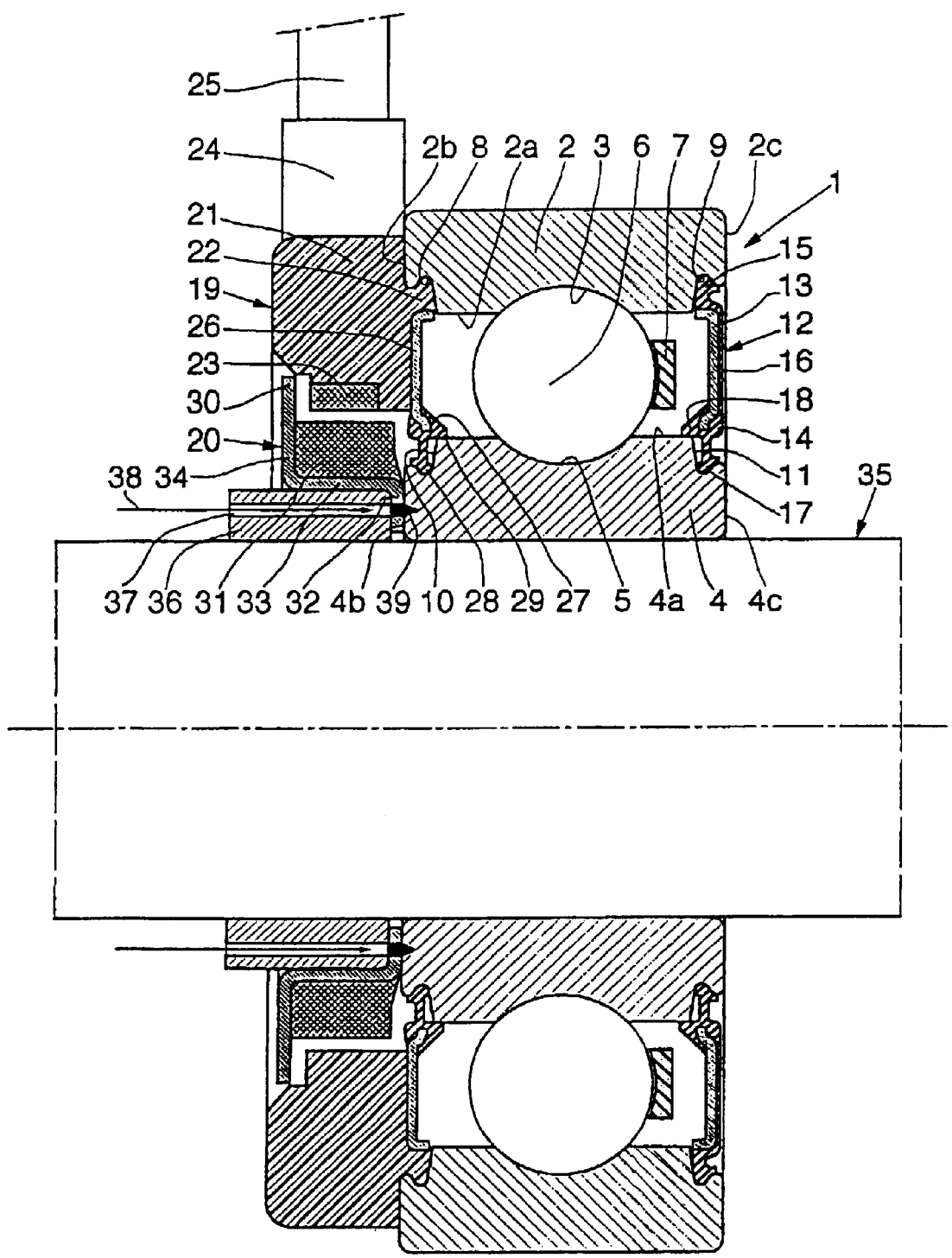
FIG. 2 is a view similar to FIG. 1, showing a stage in the assembly of the bearing.

As can be seen in FIGS. 1 and 2, the bearing 1 comprises an outer race 2 provided on its bore 2a with a toric raceway 3, an inner race 4 provided on its exterior surface 4a with a toric raceway 5, and a row of rolling elements 6, in this case balls, arranged between the raceway 3 of the outer race 2 and the raceway 5 of the inner race 4. The row of rolling elements 6 is held by a cage 7 made of a synthetic material, comprising an annular part arranged between the outer 2 and inner 4 races on one side of the row of rolling elements 6, and spacing parts arranged between said outer 2 and inner 4 races and between the rolling elements 6.

The outer race 2 is also provided with two opposed radial lateral face 2b, 2c. Two grooves 8 and 9, which are symmetric with respect to the radial plane passing through the center of the rolling elements 6, are formed in the bore 2a of the outer race 2, the groove 8 being adjacent to the lateral face 2b and the groove 9 being adjacent to the lateral face 2c.

The inner race 4 is also provided with two opposed radial lateral faces 4b, 4c in the same radial plane as the lateral faces 2b and 2c respectively. Two annular grooves 10 and 11 are formed in the exterior surface 4a of the inner race 4 and are adjacent to the lateral faces 4b and 4c respectively. Axially, the groove 10 is at the same level as the groove 8. The same is true of the groove 11 with respect to the groove 9.

A sealing member referenced 12 in its entirety is fixed to the outer race 2 and rubs against the inner race 4. The sealing member 12 comprises a rigid metal armature 13 in the general shape of a disk and provided at its radial ends with small-size cylindrical or oblique rims which improve its rigidity. Overmolded onto the armature 13 is an elastic part 14 for example made of rubber. The elastic part 14 is annular and comprises, at its large-diameter end, a bulge 15 force-fitted into the groove 9. The elastic part 14 is extended inward by a fine layer 16 which covers the armature 13 lying more or less flush with the radial plane of the lateral faces 2c and 4c. Finally, the elastic part 14, at its small-diameter end, has a first lip 17 in dynamic rubbing contact with the bottom of the channel 11 of the inner race 4, and a second sealing lip 18 in dynamic rubbing contact with the exterior surface 4a of the outer race 4 in close proximity to the groove 11.

This sealing member 12 is of the type which is standard in uninstrumented bearings and guarantees a high level of sealing by virtue of the complex shape of the lips 17 and 18, both against the ingress of contaminants from the outside and against the leak of the lubricant, oil or grease, packed inside the bearing 1.

Fixed on the other side of the bearing 1 is an assembly for detecting rotation parameters, comprising a sensor assembly 19 and an encoder assembly 20.

The sensor assembly comprises a sensor holder unit 21 made of a synthetic material, for example injection molded polyamide, of annular overall shape, in contact with the lateral face 2b of the outer race 2 and provided with a bulge 22 projecting into the groove 8 of the outer race 2. The bulge 22 fixes the sensor holder unit 21 to said outer race 2 and provides static sealing between the sensor holder unit 21 and the outer race 2. A sensor 23 is arranged on a bore of the sensor holder unit 21. An outlet part 24 for an electric conductor 25 extends radially toward the outside and may also facilitate the orientation of the conductor 25 leaving the sensor assembly 19. Of course, the conductor 25 is connected to the sensor 23 in a way which has not been depicted.

The sensor assembly 19 also comprises an armature 26 of identical shape to the armature 13 of the sealing member 12 and arranged symmetrically with respect to a radial plane passing through the center of the rolling elements 6. The small-diameter end of the armature 26 supports a seal 27, overmolded onto said end and made of an elastic material. The seal 27 comprises a lip 28 identical to the lip 17, and a lip 29 identical to the lip 18 of the sealing member 12.

In other words, the seal 27 is of a shape similar to that of the elastic part 14 of the sealing member 12 in the zone close to the inner race 4. The lip 28 is in contact with the bottom of the groove 10, matching its shape, while the sealing lip 29 is in contact with the exterior surface 4a in close proximity to the groove 10. It can thus be seen that the rolling bearing 1 is dynamically sealed in identical ways on both sides and that the sealing is good by virtue of the shape of the sealing lips.

The encoder assembly 20 comprises an annular armature 30 made of metal and an active part 31.

The armature 30 comprises a first radial portion 32 in contact with the lateral face 4b of the inner race 4 and welded to the latter, for example using spot welding, a cylindrical portion 33 which extends axially away from the inner race 4 starting from the large-diameter end of the first radial portion 32, and a second radial portion 34 which extends toward the outside starting from the opposite end of the cylindrical portion 33 to the first radial portion 32. The second radial portion 34 extends up close to the sensor holder unit 21 with which it forms a narrow passage, providing satisfactory sealing.

The active part 31 of the encoder assembly 20 is mounted on the exterior surface of the cylindrical part 33 and on a surface of the second radial portion 34 on the same side as the inner race 4. The active part 31 is positioned facing the encoder 23 with a radial gap. The sensor 23 and the active part 31 of the encoder are enclosed in a space which is delimited axially, on one side, by the second radial portion 34 of the armature 30, and on the other side, by the seal 27 that forms part of the sensor assembly 19. These elements are thus protected against the ingress of contaminants from the outside and against the ingress of lubricant from the zone of the rolling elements 6.

The additional sealing means consisting of the armature 26 and the attached lips 28 and 29 make it possible to ensure extremely good sealing and thus to keep the lubricant around the rolling elements, something which makes it possible to prolong the life of the bearing 1, particularly when it is being used at high temperature. The outer 2 and inner 4 races are of standard type and are therefore inexpensive. The armatures 13 and 26 are identical and of standard type, hence reducing the number of different parts that need to be sourced, stocked and used. The shape of the seal 27 is identical to that of the small-diameter part of the sealing member 12, hence yielding a simplification in terms of molds.

FIG. 2 illustrates one possible method for the manufacture of the bearing 1. The bearing 1, equipped with the sealing member 12 and with the sensor assembly 19, is mounted on a mandrel 35. The encoder assembly 20 is placed on the same mandrel 35 facing in the appropriate direction with a view to its permanent mounting, the first radial portion 32 arranged on the same side as the lateral face 4b of the inner race 4. A centering component 36 of annular shape, with a generally rectangular cross section and having a certain number of axial through-openings 37, is positioned between the mandrel 35 and the cylindrical portion 33 of the armature 30. The bearing 1 and the encoder assembly 20 are thus centered on a common element, the mandrel 35, and are therefore coaxial.

A laser beam represented by the arrow 38 is then sent through the openings 37 to carry out the spot welds referenced 39 between the first radial portion 32 of the armature 30 and the inner race 4. Welding is performed at a relative distance from the raceway 5 which will therefore not experience any deformation. In addition, spot welding uses a small amount of energy. The encoder assembly 20 is thus perfectly centered with respect to the inner race 4 of the bearing 1, this centering being permanently maintained by the spot welds 39. The centering piece 36 and the mandrel 35 are then withdrawn.

By virtue of the invention, the groove 8 of the outer race 2, initially designed to accommodate a seal, is of standard type and is identical to the groove 9 in which the standard sealing member 12 is mounted. The machining of this groove 8 therefore does not demand any special tooling compared with the conventional uninstrumented bearing. The outer race 2 can be manufactured economically at the same time as the conventional rolling bearing races.

The material used for the seal 27 and the elastic part 14 of the sealing member 12 will preferably be identical, for example nitrile. The dynamic sealing of these two sealing means is of the high-protection type. By virtue of the combination of narrow passages and rubbing parts, it offers both effective sealing and reduced friction, hence limiting energy losses and heating of the bearing 1. This type of sealing is commonly used in uninstrumented bearings of the rigid single-row ball bearing type.

The sensor holder unit 21, which is made of a different material from that of the seal lips, will be overmolded onto the armature separately. The sensor holder unit 21 may, for example, be made of polyamide. The active part 31 of the encoder may be obtained by overmolding plastoferrite, this material being magnetized with a view to producing a multi-pole ring which rotates past one or more magneto-sensitive sensors.

Figure 3:
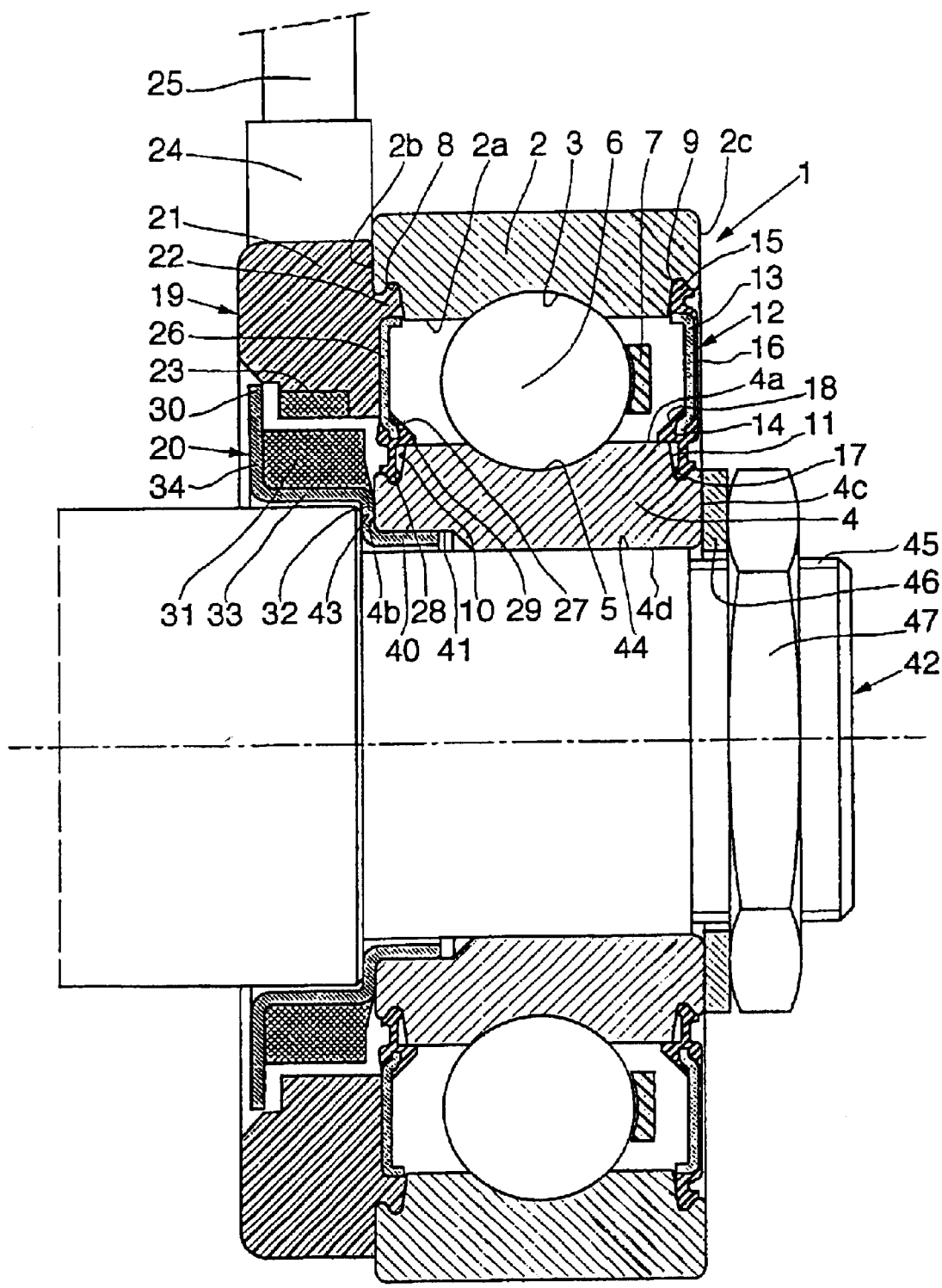
FIG. 3 is a view in axial section of a rolling bearing according to a second embodiment of the invention.

The embodiment illustrated in FIG. 3 is similar to the one in FIG. 1, except that the armature 30 of the encoder assembly 20 comprises an additional cylindrical portion 40 extending from the small-diameter end of the first radial portion 32 toward the lateral face 4c of the inner race 4. The inner race 4 is provided on its bore 4d with a cylindrical bearing surface 41 onto which said additional cylindrical portion 40 is force-fitted. The encoder assembly 20 is thus fixed by force-fitting rather than being welded as it was in the previous embodiment.

The bearing 1 is here depicted mounted on its shaft 42. The shaft 42 has a shoulder 43, a cylindrical exterior surface 44 and a threaded portion 45 which takes a washer 46 and a nut 47. The bore 4d of the inner race 4 is mounted on the exterior surface 44. The first radial portion 32 of the armature 30 comes into contact with the shoulder 43, while the lateral face 4c of the inner race 4, on the opposite side to the armature 30, is held axially in place by the washer 46 and the nut 47. The bearing is thus axially immobilized on one side by the shoulder 43 and on the other side by the washer 46 and the nut 47. The cylindrical bearing surface 41 formed on the bore 4d of the inner race 4 serves both for the force-fitting and for the centering of the armature 30. Of course, said cylindrical bearing surface 41 will be radially offset from the bore 4d so that the additional cylindrical portion 40 of the armature 30 does not project inward and does not impede the mounting of the bearing on the cylindrical surface 44 of the shaft 42.

Figure 4:
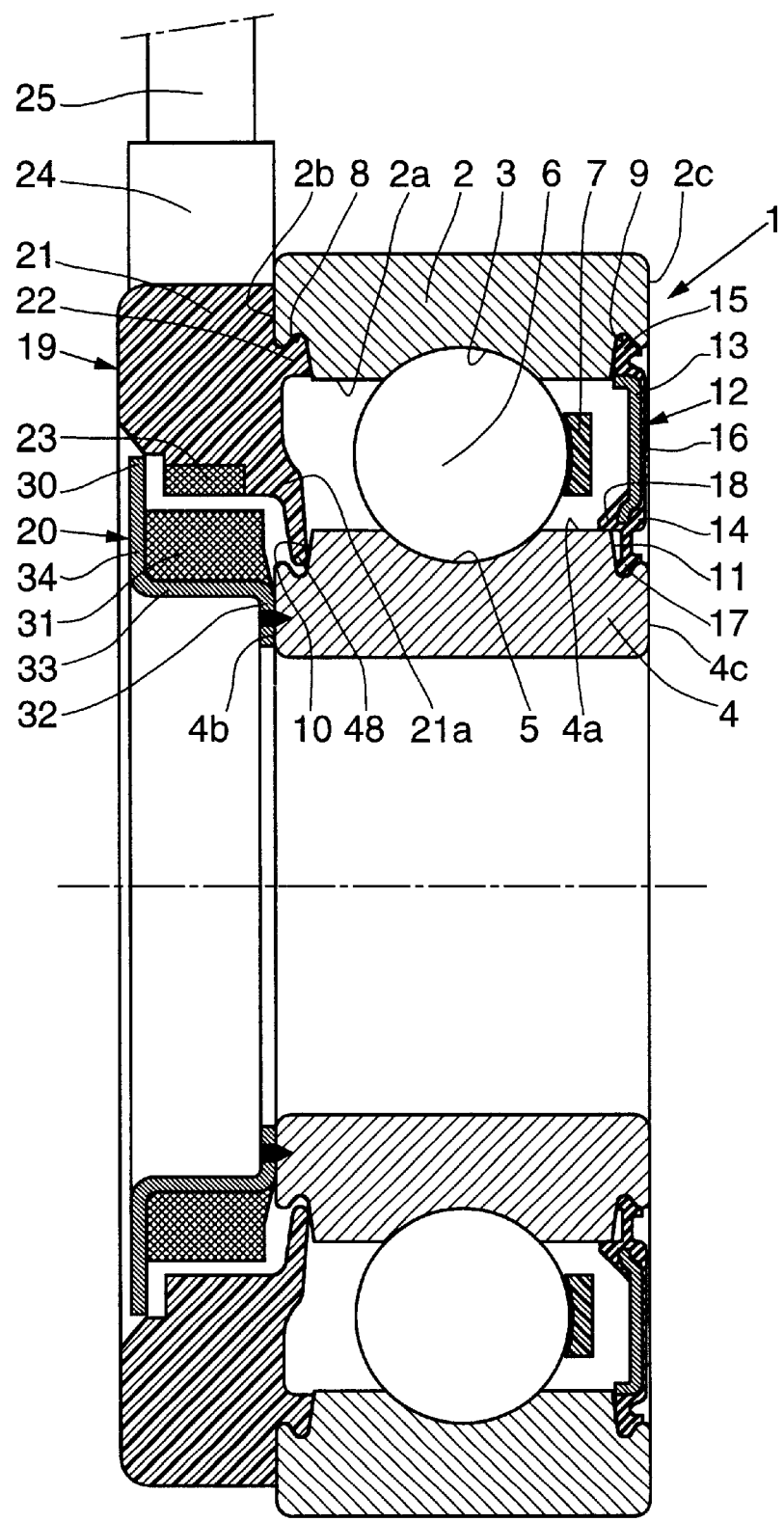
FIG. 4 is a view in axial section of a rolling bearing according to a third embodiment of the invention.

In FIG. 4, it can be seen that the sensor holder unit 21 has no metal armature and that its end 21a axially closest to the rolling elements 6 and radially closest to the inner race 4 is extended toward said inner race 4 by a roughly radial sealing lip 48 in rubbing contact with a surface of the groove 10. Thus, the sealing means forms, with the sensor unit 21, one and the same component which is molded integrally.

Of course, these few embodiments are nonlimiting.

Thus, without departing from the scope of the invention, the sensor unit could be secured to the non-rotating race of the rolling bearing by adopting a fixing system that does not employ the groove of said race, it then being possible for said groove to be used for fitting a second seal identical to the first seal 12, this second seal being substituted for the additional sealing means secured to the sensor unit in the embodiments of FIGS. 1 to 4.

It is thus possible very economically to obtain a rolling bearing with an information sensor using components of a conventional basic bearing that can be selected from the range that bearing manufacturers call the ISO range. As the encoder is fixed to the rotating race outside of the zone of the bearing surface of the sealing lips, it is possible to keep a standard race profile in said zone and to use seals which also involve standard parts and which are therefore economical, but at the same time retaining the possibility of using complex shapes that guarantee perfect sealing. The bearing with information sensor may be handled in complete safety without the risk of losing components, right up to the time of final mounting in the mechanical assembly for which it is intended.

What is claimed is:

1. A rolling bearing device comprising an outer race, an inner race, at least one row of rolling elements arranged between two raceways of the outer and inner races, a first sealing means between the outer and inner races, an information sensor assembly comprising a sensor unit supported by the non-rotating race of the bearing and an encoder element comprising an annular support and an active part, said encoder element being mounted on the rotating race via the annular support, and at least one second sealing means provided on the information sensor assembly side to isolate said assembly from the inside of the bearing by collaborating with the rotating race in a zone lying axially between the active part of the encoder and the rolling elements, wherein the annular support of the encoder element comprises an armature comprising a radial portion coming into contact with an external radial face of the rotating race, the active part of the encoder element being arranged axially on the outside of the rotating race.

2. The device according to claim 1, wherein the radial portion of the armature of the encoder element is welded to said external radial face of the rotating race.

3. The device according to claim 1, wherein the armature of the encoder element comprises a supplementary cylindrical portion meeting the radial portion and extending axially toward the inside of the rotating race, the supplementary cylindrical portion being mounted on a cylindrical bearing surface of the rotating race.

4. The device according to claim 1, wherein the race to which the sensor unit is fixed has two annular groovesone formed on each side of said race, one accommodating the sensor unit and the other accommodating a seal.

5. The device according to claim 1, wherein the second sealing means is comprised of a radial extension of the sensor unit of which said second sealing means forms an integral part.

6. The device according to claim 1, wherein the outer and inner races are symmetric with respect to a radial plane passing through the centers of the rolling elements.

7. The device according to claim 1, wherein the said first and second sealing means each comprise at least one identical sealing lip.

8. The device according to claim 1, wherein said first and second sealing means each collaborate with a bearing surface of the rotating race, and with the two bearing surfaces being identical.

9. The device according to claim 1, wherein said first and second sealing means, each comprise at least one identical armature.

10. The device according to claim 1, wherein a cylindrical portion meets the radial portion and extends axially toward the outside of the rotating race, said cylindrical portion supporting the active part of the encoder.

11. The device according to claim 10, wherein the armature of the encoder element comprises a second radial portion meeting the cylindrical portion supporting the active part and directed toward the sensor unit so as to afford protection by creating a narrow passage.

12. The device according to claim 1, wherein the sensor unit supports said second sealing means.

13. The device according to claim 12, wherein the second sealing means and the sensor unit are attached.

14. The device according to claim 1, wherein the non-rotating race of the bearing supports said second sealing means.

15. The device according to claim 14, wherein the race to which the sensor unit is fixed comprises two annular grooves, one formed on each side of the race to which the sensor unit is fixed, with one of said two annular grooves accommodating a seal of said first sealing means, the other groove accommodating the second sealing means.

16. The device according to claim 15, wherein the second sealing means includes a seal identical to the seal of said first sealing means.

17. The device according to claim 1, wherein the first sealing means comprises a seal supported by the race to which the sensor unit is fixed and in rubbing contact with the race to which the encoder element is fixed, said seal being mounted on the opposite side to the second sealing means.

18. The device according to claim 17, wherein the second sealing means and the seal mounted on the opposite side and supported by the race to which the sensor unit is fixed each collaborate with a bearing surface of the rotating race, the two bearing surfaces being identical.

19. The device according to claim 17, wherein the second sealing means and the seal mounted on the opposite side and supported by the race to which the sensor unit is fixed each have at least one sealing lip, the two sealing lips being identical.

20. The device according to claim 19, wherein the second sealing means and the seal mounted on the opposite side and supported by the race to which the sensor unit is fixed each comprise an armature, the two armatures being identical.

\* \* \* \* \*